United States Patent Office 3,473,891
Patented Oct. 21, 1969

3,473,891
PROCESS FOR THE CONTINUOUS PRODUCTION OF AQUEOUS AMMONIUM THIOSULFATE SOLUTIONS
Ernst Mack, Mannheim-Rheinau, Germany, assignor to Th. Goldschmidt A.G., Essen, Germany
No Drawing. Filed Feb. 14, 1967, Ser. No. 615,920
Claims priority, application Germany, Mar. 5, 1966, G 46,239
Int. Cl. C01b 17/64
U.S. Cl. 23—115
11 Claims

ABSTRACT OF THE DISCLOSURE

The invention is concerned with a two-stage process for the continuous production of aqueous ammonium thiosulfate solutions. Ammonium bisulfite solution, ammonia, either in the form of gaseous ammonia or as ammonium hydroxide solution, sulphur, and catalytically acting amounts of hydrogen sulfide, are reacted in a first stage in such quantities that the solubility product of ammonium sulfite and ammonium thiosulfate is not exceeded. The solution obtained in the first stage is subsequently, in a second stage, passed through a bed of sulphur. The sulphur in the second stage has preferably a grain size of about 0.1 to 1.5 mm. The preferred temperature range for carrying out the first stage reaction is about between 20 to 50° C. The invention is suitable for the production of relatively concentrated ammonium thiosulfate solutions of, for example, 60% as they are commonly used in industry. Crystalline ammonium thiosulfate may be processed from the solutions obtained in accordance with the invention.

DESCRIPTION OF THE INVENTION

The invention generally relates to ammonium thiosulfate and is particularly directed to a process for the continuous production of aqueous ammonium thiosulfate solutions. The inventive process is particularly suitable for the production of such solutions having a relatively high ammonium thiosulfate concentration. The invention is based on the reaction of ammonium sulfite solutions and sulphur in the presence of small amounts of sulfide ions.

A number of discontinuous or batch processes have been proposed for the preparation of ammonium thiosulfate solutions, which latter may be further processed into crystalline ammonium thiosulfate. Batch-wise preparation of ammonium thiosulfate solutions has been preferred hitherto. The reason for this is that in the prior art procedures, in which the ammonium thiosulfate is produced in a single vessel or reactor, it is difficult continuously to supply or dose the required reaction components so as to achieve a quantitative reaction, to wit, to obtain a solution or slurry in which the ammonium thiosulfate is quantitatively formed.

The primary object of the present invention is to prepare ammonium thiosulfate solutions, preferably of high concentrations, in a continuous manner.

Generally, it is an object of this invention to improve on the art of ammonium thiosulfate manufacture, as presently practiced.

Of particular interest in the context of the present invention is the continuous production of ammonium thiosulfate solutions containing about 60% by weight of ammonium thiosulfate, to wit, solutions as they are commonly supplied and used by the industry. Of course, it is within the scope of this invention to prepare crystallized ammonium thiosulfate from the solutions after they have been produced continuously in accordance with the present invention.

Briefly, and in accordance with the invention, ammonium thiosulfate is continuously manufactured in two stages. In the first stage, substantially equimolar amounts of ammonium bisulfite solution, gaseous ammonia or ammonium hydroxide solution and sulphur, as well as catalytically acting amounts of hydrogen sulfide are supplied to a first vessel or reactor. The amounts of the enumerated ingredients are chosen so that the solubility product of ammonium sulfite and ammonium thiosulfite is not exceeded. Thereafter, in a second stage, the solution obtained in the first stage is passed through a sulphur-containing reactor. The solution obtained in the second stage may be decolorized in known manner with ammonium bisulfite. The reactor of the first stage may be termed the principal or main reactor, while the second reactor of the second stage serves the function of an after-treatment.

According to a preferred embodiment of the invention, the temperature in the first stage or reactor should be about between 20 to 50° C.

It should be emphasized that the inventive procedure may also successfully be carried out with ammonium bisulfite solutions which contain a small amount of ammonium sulfite proper.

The final concentration of the resulting ammonium thiosulfate liquor is dependent on the concentration of the ammonium bisulfite solutions used in the first stage. As stated, this ammonium bisulfite solution may contain small amounts of ammonium sulfite. It is therefore advantageous to carry out the inventive procedure in such a manner that the ammonium bisulfite solution used in the first stage has a concentration such that the resulting ammonium thiosulfate liquor will have the desired strength or concentration of, for example, about 60%. If an ammonium thiosulfate liquor of 60% concentration is desired, the starting system of the first stage using gaseous ammonia should have the following composition:

$$SO_2 = 31\%$$

$$NH_3 = 9.3\%$$

The mole ratio should be as follows: $NH_3:SO_2 = 1.13$ to 1.00. Such a solution may, for example, be obtained by absorbing $SO_2$-containing gases in ammonium sulfite solutions.

The ammonium sulfite which is primarily and intermediately formed in the inventive procedure, reacts immediately with the sulphur to form the more readily soluble ammonium thiosulfate, so that also with highly concentrated solutions no ammonium sulfite precipitates.

At the same time as the ammonium bisulfite reacts with the ammonia, the amount of ammonia supplied to the system is adjusted so that a pH range most favorable for the reaction is maintained. This range is about 8.8 to 9.2.

An advantage of the inventive procedure is that the amount of sulphur in the first reaction stage need not be stoichiometrically exact. If the amount of sulphur is insufficient, then the reaction yield obtained in the main reactor is lower than if there is an excess of sulphur. Quantitative reaction takes, however, place in both instances in the sulphur-containing buffer zone of the second stage or reactor.

The reaction is catalytically accelerated by the presence of small amounts of ammonium sulfide. By continuously introducing hydrogen sulfide gas in low concentration (sulfide content <0.1%) into the first reactor, it is thus possible to operate in the relatively low temperature range of 20 to 50° C., preferably 30 to 40° C. In this manner, operation at ordinary pressure, resulting in simplified dosing of the ingredients is thus rendered possible.

Due to the exothermic nature of the reaction, primarily caused by the simultaneously occurring neutralization, it is not necessary to supply heat to the system. The desired temperature range can be easily maintained by cooling with water.

The first stage may, for example, be carried out in a reactor which is in the form of a vessel fitted with stirring means and cooling jacket and having venting means leading to the atmosphere. The vessel should also be supplied with the necessary means for supplying gases, solutions and sulphur in exact dosages. The supply of exact amounts of the solutions and gases is facilitated by the relatively low temperature range in which the reaction takes place at normal atmospheric pressure. This also facilitates the supply of the sulphur. The continuous discharge of the solution from the first stage of the main reactor, which solution normally has reacted to an extent in excess of 80%, may be accomplished in simple manner by an overflow, weir or the suction of a pump. This solution is then conveyed to the second reactor of the second stage.

The second reactor preferably comprises a reaction bed of sulphur through which the solution emanating from the first stage is passed. The main function of the second reactor resides in assuring quantitative reaction of the sulfite to thiosulfate, independent from the reaction rate which took place in the first reactor. In this manner, continuous operation is substantially facilitated and the desired result is assured because of a completely reacted solution may be continuously discharged from the sulphur bed.

The sulphur buffer or bed of the second reactor has not only the described fuction but simultaneously, by choosing a specific grain size for the sulphur, it may serve as a natural filter for the thiosulfate solution. The filter bed of the second reactor thus will filter out suspended particles and particularly sulphur particles which are contained in the solution. Experience has demonstrated that the sulphur in the second reactor should preferably have a particle or grain size of about 1.1 to 1.5 mm. In contrast to the prior art batch processes, separation of excess of sulphur is not necessary. The consumption of sulphur in the reactor of the second stage is dependent on the reaction rate that has taken place in the reactor of the first stage. Dependent on the dimensions of the sulphur bed, sulphur has to be added intermittently to the bed. If the continuous flow is not to be interrupted, it is therefore advantageous to operate with two sulphur filters of relatively small dimensions which are alternatively connected so that when the first filter has to be replenished with sulphur it is disconnected and the flow is directed through the second sulphur filter and vice versa.

From a process technical point of view it is of significance that a yellow tint of the solution emanating from the sulphur filter indicates quantitative reaction in a most simple manner. This yellow color or tint is caused by the presence of polysulfides which only remain stable and thus can be visually detected after all the ammonium sulfite has been converted. The presence of the yellow color indicates the absence of ammonium sulfite which, in turn, is a sure sign post that all the ammonium sulfite has reacted to thiosulfate.

The decolorization of the yellow solution may be continuously effected by adding amomnium bisulfite solution at the discharge end of the reactor of the second stage. At the same time, a portion of any excess of ammonia is thus neutralized and the ammonium thiosulfate solution is enriched with ammonium sulfite to an extent sufficient to stabilize the ammonium thiosulfate solution.

As will be apparent from the following example, the reaction speed, of course, slows down significantly at the end of the reaction, if a discontinuous or batch-wise procedure is employed. By contrast, in the inventive continuous procedure, a constant reaction speed has been observed. The inventive continuous procedure is much more efficient and economical, not only in respect to the time gained in regard to the neutralization, but the throughput per time unit is substantially higher.

The invention will now be described by an example, it being understood, however, that this example is given by way of illustration and not by way of limitation and that many changes may be effected without affecting in any way the scope and spirit of the invention as recited in the appended claims.

The main reactor of the first stage is continuously supplied with:

(a) 65.7 kg./hr. of ammonium bisulfite solution containing 32.6% by weight of $SO_2$ and 9.75% by weight of $NH_3$;
(b) 7.5 N m.³/hr. of ammonia in gas form;
(c) 10.4 kg./hr. of sulphur of a grain size of <2 mm.;
(d) 33 N l./hr. of gaseous hydrogen sulfide; and
(e) 30 g./hr. of a wetting agent in the form of polyethylene glycol ether of an alcohol.

The amounts of the ingredients are measured and dosed by flow meters. The sulphur was supplied to the reactor by means of a feed screw.

81.8 kg./hr. of ammonium sulfite containing ammonium thiosulfate solution having the following composition are continuously discharged from the main reactor: 57.6% of $(NH_4)_2S_2O_3$, 2.7% of $(NH_4)_2SO_3$; 0.8% of $NH_3$ and 0.05% of $(NH_4)_2S$.

The temperature is maintained at 30° C. by water cooling.

The discharged solution flows subsequently through a cylinder-shaped sulphur filter of the size of about 50 liters. The sulphur was deposited on a net-like sieve with the meshes having a diameter of about 2 mm. The sulphur in the filter has a grain distribution of:

| Percent | Mm. |
|---|---|
| 15.0 | >1 |
| 40.8 | 0.5–1 |
| 44.2 | <0.5 |

The clear solution of yellowish color had upon discharge from the sulphur bed the following composition: 60.6% of $(NH_4)_2S_2O_3$ 0.8% of $NH_3$ and 0.02% of $(NH_4)_2S_x$. No $(NH_4)_2SO_3$ could be detected. For decolorization and stabilization purposes, the yellow solution was continuously admixed at the discharge of the sulphur filter with 0.6 kg./hr. of ammonium bisulfite solution containing 32.6% of $SO_2$ and 9.8% of $NH_3$. In this manner, 83.0 kg./hr. of colorless ammonium thiosulfate solution containing 60.2% of $(NH_4)_2S_2O_3$, 0.7% of $NH_3$ and 0.4% of $(NH_4)_2SO_3$ were obtained.

For comparison purposes, the reaction was effected batch-wise in the same reaction vessel as the one used for first stage above under otherwise identical conditions.

118 liters of bisulfite solution containing 43% of $SO_2$ and 12.5% of $NH_3$ were mixed with 54.5 liters of water and ammonia gas in an amount of 12 Nm.³/h. were introduced for two hours under cooling. The ammonium sulfite slurry thus obtained was admixed at 30° C. with 39.6 kg. of sulphur of the same grain size as in the continuous procedure, 1.0 kg. of $(NH_4)_2S$ solution of 30% concentration and 95 ml. of wetting agent.

The reaction solution contains:

| | $(NH_4)_2S_2O_3$, percent by weight | $(NH_4)_2SO_3$, percent by weight | $NH_3$, percent by weight |
|---|---|---|---|
| 1½ hrs. after $NH_3$ introduction | 42.7 | 14.6 | 0.5 |
| 3 hrs. after $NH_3$ introduction | 49.4 | 8.9 | 0.5 |
| 5 hrs. after $NH_3$ introduction | 54.0 | 5.5 | 0.5 |

While a specific embodiment of the invention has been shown and described in detail to illustrate the application of the inventive principles, it will be understood that the invention may be embodied otherwise without departing from such principles.

What I claim is:

1. A process for the continuous production of ammonium thiosulfate solutions which comprises:

(a) reacting in a first stage aqueous ammonium bisulfite solution, ammonia and sulphur in the presence of catalytically active amounts of hydrogen sulfite, in amounts so as not to exceed the solubility product of ammonium sulfite and ammonium thiosulfate, whereby a solution is obtained; and (b) passing the solution in a second stage through a sulphur bed.

2. A process as claimed in claim 1, wherein the solution emanating from the sulphur bed is decolorized by adding thereto ammonium bisulfite.

3. A process as claimed in claim 1, wherein the temperature in said first stage is about between 20 to 50° C.

4. A process as claimed in claim 1, wherein the sulphur bed contains sulphur having a grain size of about between 0.1 to 1.5 mm.

5. A process as claimed in claim 1, wherein said ammonium bisulfite solution, said ammonia and said sulphur are supplied to said first stage in substantially equimolar amounts.

6. A process as claimed in claim 1, wherein said ammonia is supplied to said first stage in gaseous form.

7. A process as claimed in claim 1, wherein said ammonia is supplied to said first stage in the form of ammonium hydroxide solution.

8. A process as claimed in claim 1, wherein said ammonium bisulfite of said first stage contains minor amounts of ammonium sulfite.

9. A process as claimed in claim 1 for the production of ammonium thiosulfate solution of about 60% concentration, wherein said first stage contains about 31% of $SO_2$ and 9.3% of $NH_3$.

10. A process as claimed in claim 1, wherein the pH in the first stage is maintained in the range of about between 8.8 to 9.2.

11. A process as claimed in claim 1, wherein said first and second stages are performed in separate reactors.

References Cited

UNITED STATES PATENTS

| | | | |
|---|---|---|---|
| 2,219,258 | 10/1940 | Hill | 23—115 |
| 2,586,459 | 2/1952 | Farr et al. | 23—115 |

OSCAR R. VERTIZ, Primary Examiner

E. C. THOMAS, Assistant Examiner

UNITED STATES PATENT OFFICE
CERTIFICATE OF CORRECTION

Patent No. 3,473,891          Dated  Oct. 21, 1969

Inventor(s)  Ernst Mack

It is certified that error appears in the above-identified patent and that said Letters Patent are hereby corrected as shown below:

In the patent - Column 5 line 3 should read as follows:

-Change "hydrogen sulfite" to
-- hydrogen sulfide --

Signed and Sealed this

Fifteenth Day of July 1980

[SEAL]

Attest:

Attesting Officer

SIDNEY A. DIAMOND

Commissioner of Patents and Trademarks